UNITED STATES PATENT OFFICE.

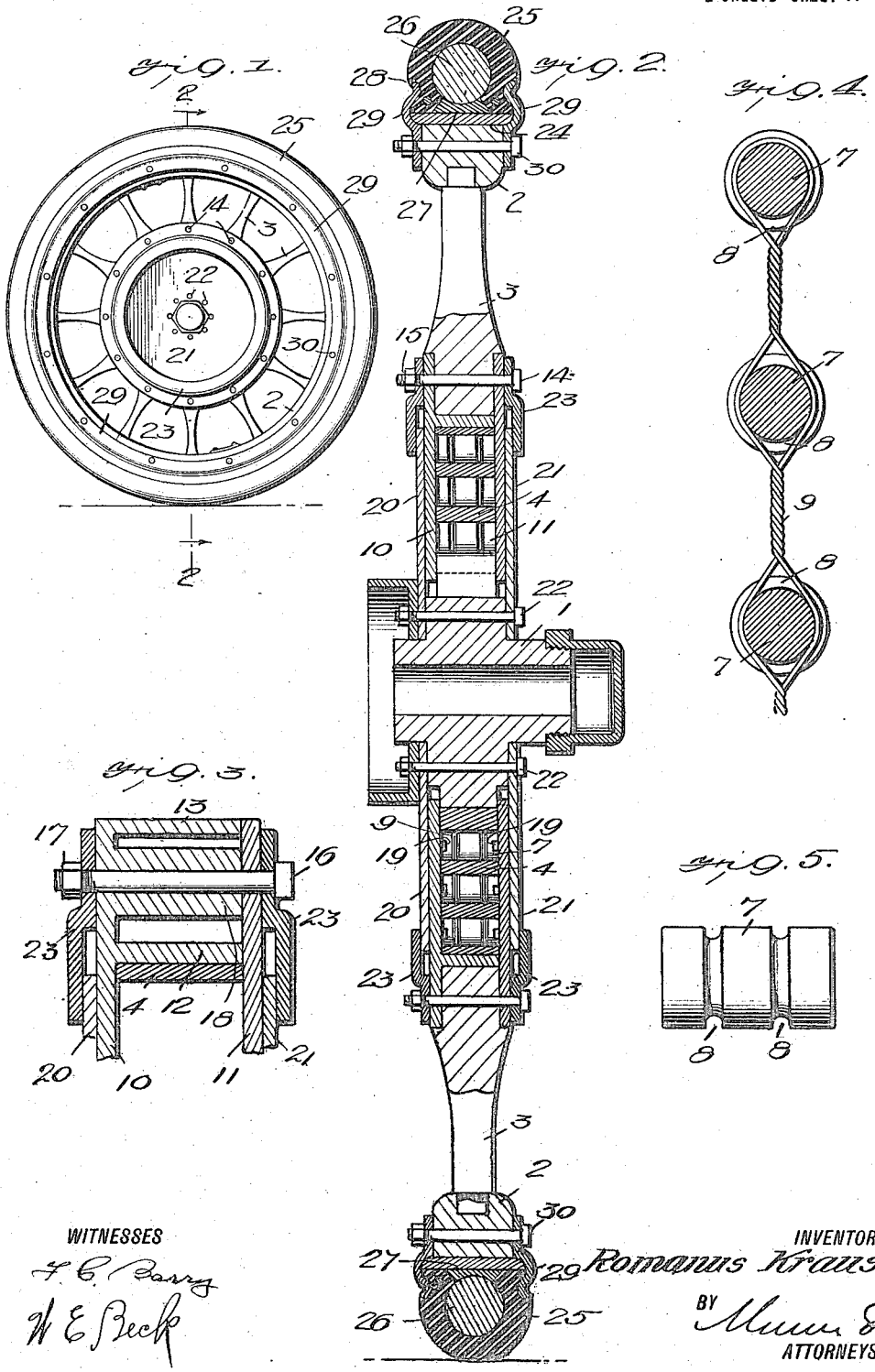

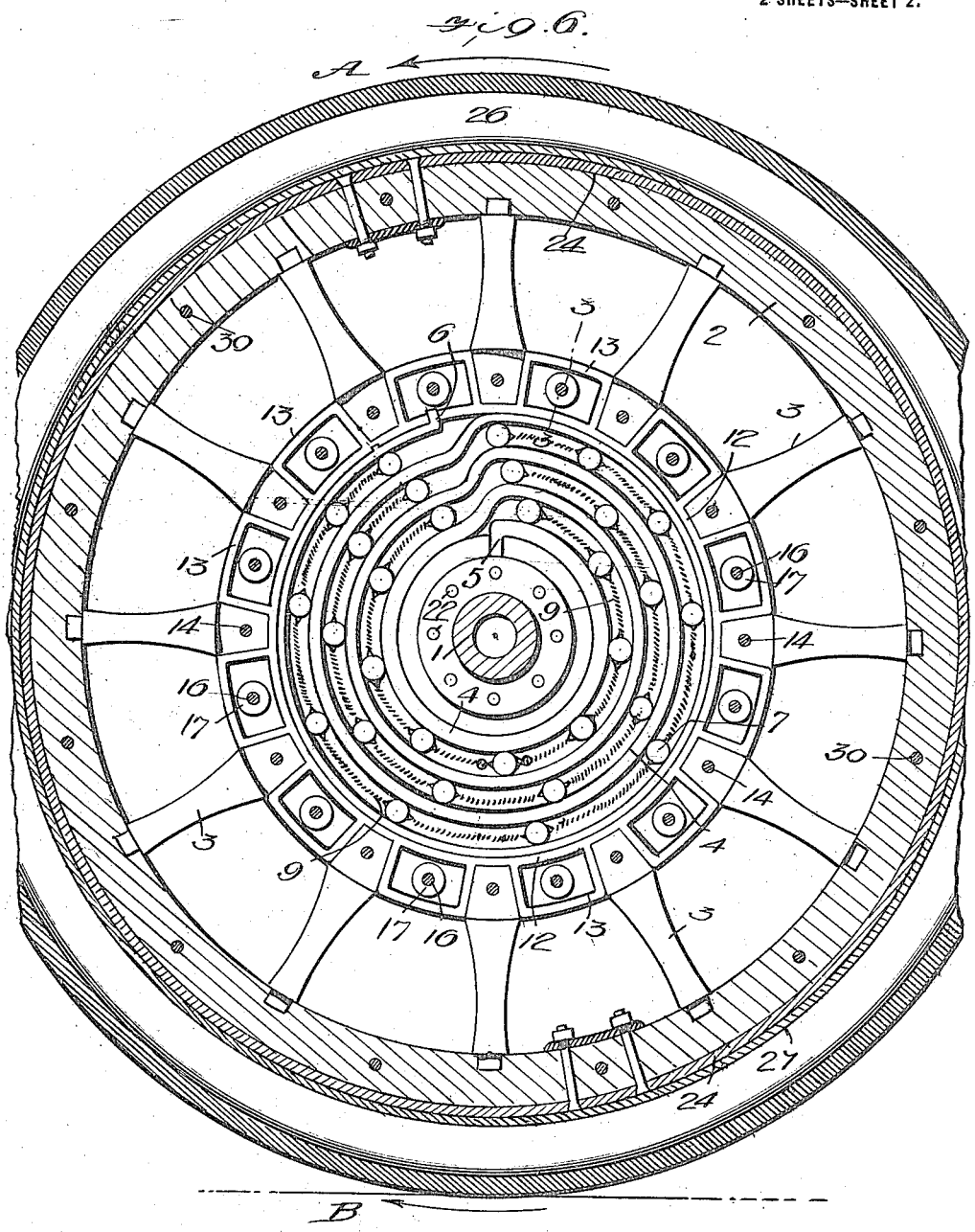

ROMANUS KRAUSE, OF BELHAVEN, NORTH CAROLINA.

SPRING-WHEEL.

1,260,403.   Specification of Letters Patent.   Patented Mar. 26, 1918.

Application filed January 20, 1917.   Serial No. 143,431.

*To all whom it may concern:*

Be it known that I, ROMANUS KRAUSE, a citizen of the United States, and a resident of Belhaven, in the county of Beaufort and State of North Carolina, have invented certain new and useful Improvements in Spring-Wheels, of which the following is a specification.

My invention is an improvement in spring wheels, and has for its object to provide a wheel of the character specified especially adapted for use with motor vehicles, wherein the cushioning mechanism is arranged between the hub and the rim.

In the drawings:

Figure 1 is a side view of the improved wheel,

Fig. 2 is a section on the line 2—2 of Fig. 1, looking in the direction of the arrows adjacent to the line, Fig. 3 is a section on the line 3—3 of Fig. 6, Fig. 4 is an enlarged detail section through the rollers, Fig. 5 is a front view of one of the rollers, and Fig. 6 is a side view with the housing plates removed, and with the felly, rim and tire in section.

In the present embodiment of the invention, the hub 1 is of usual construction, and the wheel proper comprises the felly 2, an inner ring to be later described, and spokes 3 which connect the rim to the inner ring. The cushioning mechanism is arranged between the hub and the ring.

The said cushioning mechanism comprises a coiled spring 4, which is connected at one end to the hub as indicated at 5, and at the other end to the inner ring as indicated at 6, the said spring having angular lugs at its ends for engaging openings in the hub and the ring, to securely connect the said ends to the said elements. The several coils of the spring are spaced apart from each other and held in proper relation by means of series of rollers 7, the rollers of each series being arranged between the convolutions and connected together, and are also held in properly spaced relation with respect to each other. Each of the said rollers is provided with a pair of parallel annular grooves 8, and the rollers of each series are connected by wires 9, which are engaged with the grooves 8 and are twisted together between the rollers. The function of the wires is to keep the rollers of each circular roller section or series equally spaced from each other.

Referring to Fig. 4, it will be noticed that each wire is passed about one end roller of the series, resting in the groove 8, and the ends of the wire are then twisted together between the said roller and the adjacent roller. The wire ends are then separated and passed around the second roller, and this procedure is repeated until all the rollers of the series are connected. It will be noticed from an inspection of Fig. 6 that at the lugs 5 and 6, each of the several coils of the spring has an oblique bend, and the rollers of each series on opposite sides of these bends are the end rollers of the series.

The inner ring before mentioned comprises a pair of housing plates 10 and 11, and the plate 10 has an annular inwardly extending rib 12 near its outer edge, which is of a depth to extend across the ends of the spokes into engagement with the plate 11. The inner ends of the spokes 3 abut this rib 12, and it will be noticed that between each adjacent pair of spokes, the said plate 10 has a spacing member 13 in the form of an inverted U-shaped rib whose free edge abuts the rib 12 when the plates 10 and 11 are connected by mechanism, to be later described. A series of sockets is formed in the peripheral surface of the end ring constituted by the said plates for receiving the inner ends of the spokes. Each socket is constituted by the ribs 12—13 and the inner faces of the housing plates. The plates are secured together at the spokes by bolts 14 which pass through the housing plates and the spokes, and are engaged by nuts 15 and between the spokes by bolts 16 which pass through the housing plates and are engaged by nuts 17. Within each rib 13, and between the same and the rib 12, the housing plate 10 is provided with a cylindrical boss 18 which has a central opening for receiving the bolt 16, and which extends across the space between the housing plates into engagement with the inner face of the housing plate 11.

It will be noticed from an inspection of Fig. 2, that these housing plates 10 and 11 do not extend into contact with the hub, being spaced apart from the hub at their inner edges a sufficient distance to permit the action of the spring 4. Both housing plates 10 and 11 have a series of pairs of lugs 19 for the middle roller of each series of rollers, the lugs of each pair being on opposite sides of the roller, as shown in Figs. 2 and 6. These lugs serve to prevent lateral movement of the rollers beyond a limited distance and hold them in proper relation with respect to the coils of the spring.

Other housing plates 20 and 21 are provided for completing the housing of the cushioning mechanism. These housing plates, which are in the form of rings, as are also the plates 10 and 11, are secured at their inner edges to the hub by means of bolts and nuts 22, and they engage the outer faces of the housing plates 10 and 11 and are slidable on the said plates. The outer edges of the said housing plates are engaged by retaining rings 23, each of the said rings consisting of two portions offset laterally with respect to each other, the one portion abutting the outer face of the adjacent plate 10 or 11 and being secured in place by the bolts 14 and the nuts 15 before mentioned, while the other portion fits the outer face of the adjacent plate 20 or 21, as the case may be.

It will be noticed from an inspection of Fig. 2, that the outer edges of the housing plates 20 and 21 are spaced apart from the integral connection between the portions of each retaining ring 23 so that the action of the spring 4 is not impeded by the said plates. The space between the hub and the inner ring is filled with a suitable lubricant so that all of the parts function in a bath of oil. All the wheels of the vehicle will be arranged in such manner that the movement of the vehicle will tend to place the spring 4 under tension. The rear wheels will be so arranged that they will rotate in the direction of the arrow A of Fig. 6, while the front wheels will be arranged to rotate in the direction of the arrow B. At the rear wheels, the axle is the rotating force, while the friction on the wheel tends to retard the rim with respect to the hub. At the front wheels the friction between the wheel and the ground tends to cause the rim to drag or lag with respect to the axle, a tendency which places the spring 4 under tension.

Should for any reason, it be necessary to replace the parts, this is easily done by removing the plates 11 and 21. In order to remove these plates it is only necessary to remove the retaining ring 23 at that side and the bolts 22. The entire spring may be slipped out laterally with the rollers in place. One coil of the spring embraces the hub closely, while the outer coil fits as closely the inner surface of the rib 12.

The tire shown more particularly in Fig. 2, is especially adapted for use with the improved wheel. The said tire is arranged upon a metal rim 24 supported on the felly, and the tire comprises a species of casing 25 of rubber, being formed approximately in the same shape as the shoe of a pneumatic tire. The edges of the shoe or casing engage the rim at the opposite side edges thereof, and a filling ring 26 of a suitable flexible material cheaper than rubber, is arranged within the hollow of the casing 25. This ring is circular in cross section and it is spaced from the rim and held well in the hollow of the casing by a ring 27 fitting at its inner face, the outer face of the rim, and at its outer face being concaved to fit the ring.

The casing is provided with cables 28 at its opposite side edges, of wire or the like, the said cables being of ring form to hold the casing firmly in place. Retaining rings 29 are provided at each side of the felly, the said rings being secured to the felly by bolts and nuts 30, and these rings extend beyond the rim 24 and engage the shoe to press the same inwardly against the ring 27 and the filling 26. The retaining rings are arched outwardly at the rim and are bent inwardly at their free edges as shown, to provide a clencher grip on the tire. The tire assists materially in the cushioning action of the wheel, possessing to a large degree the resiliency of a pneumatic tire, at a much less cost and with less liability to be damaged.

With the improved wheel, the liability of stripping the gears will be greatly decreased, because of the arrangement of the spring. The springs act as shock absorbers between the transmission and the wheels.

I claim:

1. A wheel of the character specified comprising a hub, a rim and a ring within the rim and concentric therewith and rigidly connected thereto in spaced relation, a substantially spiral spring connected at one end to the hub and at the other to the ring, a series of rollers between each pair of adjacent coils, a plurality of flexible connections between the rollers of each series, said rollers having grooves for the connections, a pair of ring-shaped housing plates at each face of the wheel, one member of each pair being connected to the ring and the other to the hub, and being slidable upon each other and having pairs of inwardly extending lugs for engaging the ends of the middle roller of each series.

2. A wheel of the character specified comprising a hub, a rim and a ring within the rim and concentric therewith and rigidly connected thereto in spaced relation, a coil spring connected at one end to the hub and at the other to the ring, a series of rollers between each pair of adjacent convolutions, a plurality of flexible connections between the rollers of each series, said rollers having grooves for the connections, and housing plates for the wheel having means for holding the rollers in predetermined position.

3. A wheel of the class specified comprising a hub, a concentric rim, and a ring within the rim, a coil spring whose ends are connected with the hub and ring, respectively, a series of rollers interposed between each two adjacent coils of said spring, and means connecting the several rollers of each series and holding them in spaced relation, and lugs engaging each middle roller of each series of rollers for holding such series in place, as described.

ROMANUS KRAUSE.

Witnesses:
FRANK SNYDER,
JOHN Q. TOOLY.

Copies of this patent may be obtained for five cents each, by addressing the "Commissioner of Patents, Washington, D. C."